United States Patent Office 3,153,089
Patented Oct. 13, 1964

---

3,153,089
PRODUCTION OF ACETOPHENONE-AZINE
Jameil Ameen, Hopewell, Va., assignor to Allied Chemical Corporation, New York, N.Y., a corporation of New York
No Drawing. Filed Aug. 16, 1961, Ser. No. 131,740
6 Claims. (Cl. 260—566)

This invention relates to a process for the production of acetophenone-azine, also known as methylphenylketazine.

Heretofore, acetophenone-azine has been generally produced by reacting hydrazine hydrate with acetophenone. This process, however, is economically unattractive due to the high cost of hydrazine. Acetophenone-azine has also been prepared by heating acetophenone-semicarbazone at 240° C. This process, however, results in unacceptably low yields of acetophenone-azine.

An object of the present invention is to provide a simple and economical process for the production of acetophenone-azine.

A further object of the invention is to provide a simple and economical process for the production of acetophenone-azine with the formation of valuable urea as by-product.

A still further object is to provide a simple and economical process for producing acetophenone-azine and by-product urea in high yields.

Other objects and advantages of the invention will be apparent to those skilled in the art from the following description.

In accordance with the present invention, acetophenone-azine is produced by reacting acetophenone-semicarbazone with acetophenone and ammonia, and recovering the acetophenone-azine from the resulting reaction mixture. This reaction may be represented by the following equation:

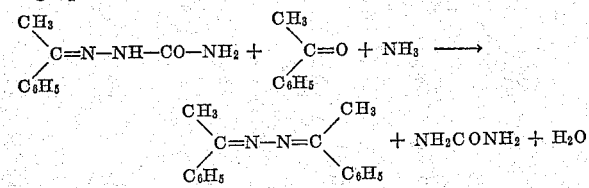

In a preferred aspect of this invention, acetophenone-azine is produced by reacting acetophenone-semicarbazone with about 1 to 2 mols of acetophenone per mol of the semicarbazone and excess ammonia at temperature of about 100° to 200° C. under substantially autogenous pressure, and recovering the acetophenone-azine from the resulting reaction mixture.

The acetophenone-semicarbazone reactant may be prepared in known manner by reacting acetophenone with semicarbazide.

Although, in preferred operation, about 1 to 2 mols of acetophenone may be used for each mol of acetophenone-semicarbazone, particularly outstanding results have been obtained using about 1.5 mols of acetophenone per mol of carbazone.

As indicated above, excess ammonia is preferably employed in the process of this invention. Use of at least about 10 mols of ammonia per mol of acetophenone-semicarbazone is desirable, the usual quantity being about 10 to 70 mols of ammonia per mol of the semicarbazone. Although greater amounts of ammonia may be used, as up to 100 mols of ammonia per mol of the semicarbazone, no additional purpose is served thereby. The ammonia may be employed in either liquid or gaseous form with equal success.

The reaction is carried out at elevated temperature which preferably ranges from about 100° to 200° C. Optimum results are obtained at reaction temperature between about 140° and 160° C.

The time required for the reaction depends primarily upon the temperature used, higher temperatures promoting more rapid reaction and thus requiring shorter times. Generally speaking, I have found the reaction to be substantially complete after about 2 hours, the preferred reaction time being between about 3 and 5 hours.

As preferred, the reaction is carried out in a confined zone under substantially the autogenous pressure developed at the temperature employed. For example, when about 50 mols of ammonia per mol of the semicarbazone are used at reaction temperature of about 140° to 160° C., an autogenous pressure of about 1300 to 1450 p.s.i.g. develops. However, if desired, the reaction may be carried out in an open zone at substantially atmospheric pressure by bubbling ammonia into a molten mixture of acetophenone-semicarbazone and acetophenone.

By means of the process of the present invention, it has been found that at least 80%, and usually over 90%, of theory of acetophenone-azine and by-product urea are obtained. Acetophenone-azine may be used as an intermediate in industrial synthesis; for example, it may be subjected to acid hydrolysis to produce hydrazine. The urea may be directly utilized in industry and agriculture.

The acetophenone-azine produced by the process of this invention may be recovered by any suitable procedure. For example, excess ammonia, if present, may be vented from the reaction zone and the reaction mass extracted with water and filtered. The resulting acetophenone-azine residue may then be purified by recrystallization from a suitable solvent, e.g. dioxane or an alcohol such as ethanol, methanol, isopropanol and n-propanol. The aqueous extract contains the valuable by-product, urea.

In typical operation, a mixture of acetophenone-semicarbazone, acetophenone and ammonia, in ratio of about 1.5 mols of acetophenone and about 10 to 70 mols of ammonia per mol of acetophenone-semicarbazone, is heated with agitation at temperature of about 140° to 160° C. under substantially autogenous pressure until the reaction is substantially complete. After the reaction, excess ammonia is vented from the reaction zone, and the reaction mixture is extracted with water and then filtered. The filtrate contains dissolved urea and undissolved unreacted acetophenone. The residue of acetophenone-azine is recrystallized from ethanol. Since acetophenone is immiscible with water, the unreacted acetophenone may be decanted from the aqueous extract and recycled to the reaction zone. If desired, the aqueous extract containing urea by-product may be evaporated to recover the urea as residue.

The following specific example, in which parts are by weight, further illustrates the process of this invention.

Example 5 parts of acetophenone-semicarbazone, 5 parts of acetophenone and 27 parts of liquid ammonia were charged into a stainless steel rocking autoclave. The autoclave was heated to 150° C. under pressure of 1370 p.s.i.g. and rocked at this temperature for about 4 hours. The autoclave was cooled to room temperature, and excess ammonia was vented therefrom. The reaction mixture was extracted with cold water and then filtered. The resulting residue was washed twice with a small amount of cold water and once with a small amount of cold ethyl alcohol. The product, after drying at temperature of about 90° C., constituted 6.22 parts and was identified as acetophenone-azine by its melting point of 121.5° C. and by infrared analysis. The amount of product recovered corresponded to an acetophenone-azine yield of 93.3% of theory.

The aqueous filtrate was analyzed for urea and was found to contain about 1.7 parts, corresponding to a yield of urea amounting to 100% of theory.

While the above describes one embodiment of my invention, it will be understood that departure may be made therefrom within the scope of the specification and claims.

I claim:

1. A process for producing acetophenone-azine which consists in reacting acetophenone-semicarbazone with about 1 to 2 mols of acetophenone per mol of the semicarbazone and excess ammonia at elevated temperature, and recovering the acetophenone-azine from the resulting reaction mixture.

2. A process for producing acetophenone-azine which consists in reacting acetophenone-semicarbazone with about 1 to 2 mols of acetophenone per mol of the semicarbazone and excess ammonia at temperature of about 100° to 200° C. under substantially autogenous pressure, and recovering the acetophenone-azine from the resulting reaction mixture.

3. A process according to claim 2 wherein the acetophenone is employed in ratio of about 1.5 mols per mol of the semicarbazone.

4. A process according to claim 2 wherein the ammonia is employed in ratio of about 10 to 70 mols per mol of the semicarbazone.

5. A process according to claim 2 wherein the reaction is carried out at temperature of about 140° to 160° C. under substantially autogenous pressure.

6. A process for producing acetophenone-azine which consists in reacting acetophenone-semcarbazone with acetophenone and ammonia, in ratio of about 1.5 mols of acetophenone and about 10 to 70 mols of ammonia per mol of the semicarbazone, at temperature of about 140° to 160° C. under substantially autogenous pressure, and recovering the acetophenone-azine from the resulting reaction mixture.

References Cited in the file of this patent

UNITED STATES PATENTS 2,894,032     Rudner _____ July 7, 1959

OTHER REFERENCES

Migrdichian: "Organic Synthesis," vol. 1, page 156 (1957) QD262 M55.

Curtius: J. Prakt. Chem., 2nd series, vol. 44, pp. 535–544 (1891).

Borsche: Ber. Deut. Chem., vol. 34, pp. 4297–4302 (1901).